United States Patent [19]

Segers

[11] Patent Number: 5,249,282

[45] Date of Patent: Sep. 28, 1993

[54] INTEGRATED CACHE MEMORY SYSTEM WITH PRIMARY AND SECONDARY CACHE MEMORIES

[75] Inventor: Dennis L. Segers, Lewisville, Tex.

[73] Assignee: Benchmarq Microelectronics, Inc., Carrollton, Tex.

[21] Appl. No.: 616,427

[22] Filed: Nov. 21, 1990

[51] Int. Cl.[5] .......................... G06F 13/00; G06F 12/08
[52] U.S. Cl. .............................. 395/425; 364/DIG. 1; 364/243.45; 364/964.6
[58] Field of Search ... 395/425; 364/243, 200 MS File, 364/DIG. 1, 243.4, 243.41, 243.45, 243.44, 964, 964.2, 964.32, 964.343, 964.6; 365/49

[56] References Cited

U.S. PATENT DOCUMENTS

| | | | |
|---|---|---|---|
| 4,464,712 | 8/1984 | Fletcher | 364/200 |
| 4,797,814 | 1/1989 | Brenza | 364/200 |
| 4,803,621 | 2/1989 | Kelly | 364/200 |
| 4,823,259 | 4/1989 | Aichelmann, Jr. et al. | 364/200 |
| 4,870,622 | 9/1989 | Aria et al. | 364/200 |
| 4,894,770 | 1/1990 | Ward et al. | 364/200 |
| 4,905,141 | 2/1990 | Brenza | 364/200 |
| 4,926,385 | 5/1990 | Fujishima et al. | 364/200 |
| 4,928,239 | 5/1990 | Baum et al. | 364/200 |
| 4,930,106 | 5/1990 | Danilenko et al. | 364/200 |
| 4,933,835 | 6/1990 | Sachs et al. | 364/200 |
| 4,933,837 | 6/1990 | Freidin | 364/200 |
| 4,939,641 | 6/1990 | Schwartz et al. | 364/200 |
| 4,953,164 | 8/1990 | Asakura et al. | 364/200 |
| 5,023,776 | 6/1991 | Gregor | 364/200 |
| 5,058,006 | 10/1991 | Durdan et al. | 364/200 |
| 5,077,826 | 12/1991 | Grohoski et al. | 364/DIG. 1 |

Primary Examiner—Alyssa H. Bowler
Attorney, Agent, or Firm—Ross, Howison, Clapp & Korn

[57] ABSTRACT

A central processing unit (10) has a cache memory system (24) associated therewith for interfacing with a main memory system (23). The cache memory system (24) includes a primary cache (26) comprised of SRAMS and a secondary cache (28) comprised of DRAM. The primary cache (26) has a faster access than the secondary cache (28). When it is determined that the requested data is stored in the primary cache (26) it is transferred immediately to the central processing unit (10). When it is determined that the data resides only in the secondary cache (28), the data is accessed therefrom and routed to the central processing unit (10) and simultaneously stored in the primary cache (26). If a hit occurs in the primary cache (26), it is accessed and output to a local data bus (32). If only the secondary cache (28) indicates a hit, data is accessed from the appropriate one of the arrays (80)-(86) and transferred through the primary cache (26) via transfer circuits (96), (98), (100) and (102) to the data bus (32). Simultaneously therewith, the data is stored in an appropriate one of the arrays (88)-(94). When a hit does not occur in either the secondary cache (28) or the primary cache (26), data is retrieved from the main system memory (23) through a buffer/multiplexer circuit on one side of the secondary cache (28) and passed through both the secondary cache (28) and the primary cache (26) and stored therein in a single operation due to the line for line transfer provided by the transfer circuits (96)-(102).

21 Claims, 5 Drawing Sheets

INTEGRATED CACHE MEMORY SYSTEM WITH PRIMARY AND SECONDARY CACHE MEMORIES

TECHNICAL FIELD OF THE INVENTION

The present invention pertains in general to cache memories and, more particularly, to an integrated memory having a primary cache and a secondary cache.

BACKGROUND OF THE INVENTION

A cache memory is a very fast local storage memory that is utilized by a central processing unit or a microprocessor. The cache memory fits into a system between the processor and the main system memory and operates as a "turbocharger" to the slower main system memory by holding copies of code and data that are frequently requested from the main system memory by the microprocessor. A cache memory system is typically made up of a cache RAM, a tag directory and cache management logic. The cahe RAM stores data or instructions which have been most recently used by the microprocessor and are therefore most likely to be needed again. The tag directory is usually a separate RAM array which hold address information and valid bits corresponding to the data in the cache RAM. The address information in the tag directory is referred to as the cache tag. The tag directory is primarily comprised of upper addresses in the overall CPU memory address which are compared with the address output by the microprocessor. If a match occurs, this indicates that data is stored in the cache RAM and the microprocessor does not have to go to the main system memory. When the data is present in the cache RAM, this is termed a "hit".

One of the advantages of cache is that the microprocessor can access data or instructions from the cache RAM without having to go to the system data and address bus. In general, when the microprocessor has to go to main memory, there are a number of "wait" states that must be programmed which essentially delay the operation of the microprocessor for a number of operating cycles in order to effect a data transfer. By utilizing the cache which operates at a much faster rate, the number of wait states for data transfer can be reduced to substantially zero.

The efficiency of the cache is traditionally measured in terms of the cache "hit rate". Hit rate is the measure of the cache's ability to maintain the most frequently used code and data requested by the microprocessor. A high hit rate means that the microprocessor spends a high percentage of its time working from the data cache RAM and a low percentage of its time requesting data from the slower main system DRAM memory. This results in a higher overall microprocessor performance.

There are a number of architectures that have been utilized with cache. One of these is referred to as a "look through" architecture and one is referred to as a "look aside" architecture. The look through architecture is a serial architecture whereas the look aside architecture is a parallel architecture. In the look through architecture, the cache is designed to fit in series between the microprocessor and the main system memory. The microprocessor "looks through" the cache to the main system memory. All memory requests from the microprocessor are first sent to the cache, then from the cache to the main system memory. The main advantage of a serial cache is that it will reduce the number of memory requests to main system DRAM memory. This reduces bus utilization of the main memory bus and the amount of memory precharge cycles (memory location setup locations). Most memory requests are handled directly out of cache without the need to access main system memory. Only when there is a cache miss is the memory request forwarded on to main system memory.

In a look aside cache, the cache is designed to fit on to the memory bus in parallel with the microprocessor and main system memory. The cache does not interrupt memory requests from the microprocessor to main system memory. Instead, all memory requests from the microprocessor are sent simultaneously to the cache and main system memory. The main microprocessor "looks aside" at the cache when sending memory requests to main system memory. If the cache hit occurs on a memory request, the cache returns the information to the microprocessor and sends a signal to the main system memory to abort the memory request. If a cache miss occurs, the cache does nothing. The memory request is completed by the main system memory.

One disadvantage to a cache memory is size constraints. In order to provide sufficient speed, most cache memories are fabricated from Static Random Access Memories (SRAM). One problem with SRAM is that it takes a substantial amount of real estate and therefore, large arrays cannot be realized. If DRAM arrays are utilized in place of SRAM arrays, a higher density can be achieved with some sacrifice in speed. Typically, an SRAM can be utilized in a cache system with zero wait states, whereas DRAM would require one or two wait states, depending upon the speed thereof. More than two wait states may be required in order to interface with the system bus.

SUMMARY OF THE INVENTION

The present invention disclosed and claimed herein comprises a cache memory for interfacing between a central processing unit and a main system memory. The cache memory includes a primary cache memory and a secondary cache memory. An interface circuit is disclosed between the primary cache memory and the secondary cache memory for allowing information to be transferred from the secondary cache memory to the primary cache memory. Hit circuitry is provided for receiving an information request from the central processing unit and determining if the requested information is present in either the primary cache memory or the secondary cache memory. Cache control circuitry is provided for accessing the requested information from the primary cache memory when the requested information is determined to be in the primary cache memory. The secondary cache memory is accessed when it is determined that the requested information is in the secondary cache memory and not in the primary cache memory. The cache control circuit is operable to transfer the requested information from the secondary cache memory to the primary cache memory during access of the requested information from the secondary cache memory.

In another aspect of the present invention, the secondary cache memory has a slower access time than the primary cache memory. In the preferred embodiment, the secondary cache memory includes an information cache configured with dynamic random access memory and the primary cache memory includes an information cache configured with static random access memory.

The primary cache memory also includes a primary tag cache utilizing a content addressable memory.

In a further aspect of the present invention, the cache control circuit is operable to simultaneously initiate access to each of the primary and secondary cache memories for the requested information during the time that the hit circuitry is determining if the requested information is in the primary or the secondary cache memories. Continued access of the secondary cache memory is inhibited when the hit circuitry indicates that the requested information is present in the primary cache memory.

In a yet further aspect of the present invention, each of the dynamic random access memory and the static random access memory have pseudo common column lines such that each column in the dynamic random access memory has a corresponding column line in the static random access memory. The transfer circuit is operable to isolate the column lines of the dynamic random access memory from those of the static random access memory. During a transfer, a single column-to-column transfer occurs between the dynamic random access memory and the static random access memory.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
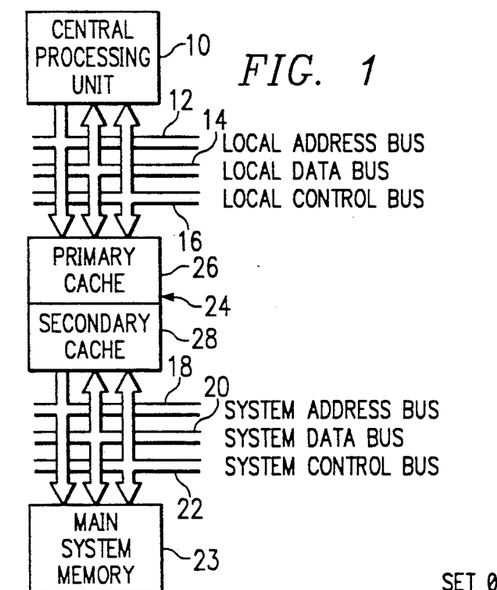
FIG. 1 illustrates a block diagram of the cache memory system of the present invention utilized in a look through architecture.

Referring now to FIG. 1, there is illustrated a block diagram of the cache memory system utilized in a look through architecture. A central processing unit 10 is interfaced with a local address bus 12, a local data bus 14 and a local control bus 16. These buses 12-16 are isolated from a system address bus 18, a system data bus 20 and a system control bus 22 by a cache memory system 24. The cache memory system 24 is comprised of a primary cache 26 and a secondary cache 28. The cache memory system 24 allows the central processing unit 10 to interface with a main system memory 23 that is interfaced with the buses 18-22 on a look through basis. Therefore, the central processing unit 10 first looks to the cache memory system 24 in order to determine if the requested data is stored there, and if not, then to the main system memory 23. The control logic in the cache memory system 24 provides this look through function.

The primary cache 26 is configured with an SRAM array, whereas the secondary cache 24 is configured with a DRAM array. Therefore, the primary cache 26 provides an increase in speed of greater than a factor of two over the secondary cache 28. By utilizing a DRAM array for the secondary cache 28, a substantial increase in speed is provided over that of the main system memory 23, but a higher density is provided, thus allowing more data to be placed in the cache memory.

In operation, the central processing unit 10 sends out a READ request and the cache memory system 24 determines whether there is a hit on the primary cache or the secondary cache in a parallel operation. If data is stored in the primary cache 26, it is also stored in the secondary cache 28. If a hit is determined in the primary cache 26, access of data from the secondary cache 28 is inhibited, since it has a slower access. Data is then output from the primary cache 26 to the central processing unit 10 without the requirement for a wait state. However, if the cache memory system 24 determined that there was only a hit in the secondary cache 28, then the data would be accessed from the secondary cache 28, routed to the central processing unit 10, and at the same time the data written into the primary cache 26. The cache memory system 24 utilizes a "Least Recently Used" (LRU) algorithm to determine which location in the primary cache 26 the data will be written to.

The secondary cache 28 is configured such that it is set associative relative to the main system memory 23. The primary cache, by comparison, is fully associative with the main system memory 23. This will be described in more detail hereinbelow.

Figure 2:
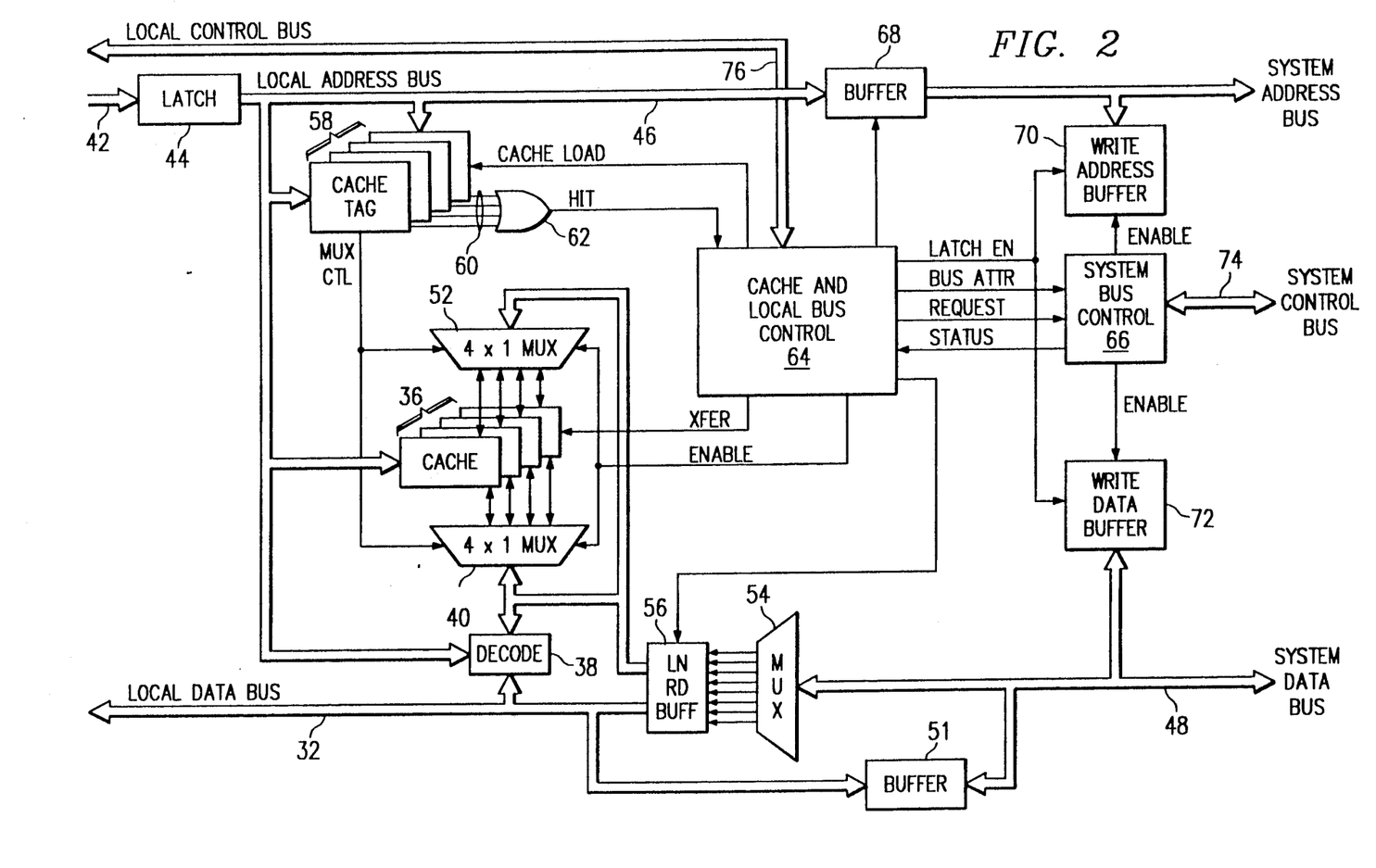
FIG. 2 illustrates an overall block diagram of the integrated cache memory system.

Referring now to FIG. 2, there is illustrated a more detailed block diagram of the cache memory system 24. The cache memory system 24 is a four-way set associative cache which generally defines the overall organization of the cache and the algorithm utilized to map the main system memory 23 to the cache RAM, as will be described hereinbelow. In general, the secondary cache 28 is set associative and the primary cache 26 is fully associative. Therefore, the primary cache 26 provides a method whereby each item of information from the main system memory 23 is stored as a unique cache entry. There is no relationship between the location of the information in the primary cache 26 and its original location in the main system memory 23. By comparison, a set associative cache is somewhat less complex, but also provides lower performance than the fully associative cache.

A local data bus 32 is provided which is operable to interface with the local data bus 14 that interfaces with the central processing unit 10. The local data bus 32 is a thirty-two bit data bus which is interfaced with a set of four caches 36, the caches 36 representing the data and instruction storage portion of both the primary cache 26 and secondary cache 28. The four caches 36 are configured such as to provide a four-way set associative cache system. As described above, the secondary cache 28 is configured with DRAM architecture and the primary cache is configured with SRAM architecture. The caches 36 has a width of 128 bytes, such that it will contain 32 double words, each double word being thirty-two bits. A column decoder 38 is provided for interfacing with the data on data bus 32, the output of which is interfaced with a multiplexer 40 that selects one of the four caches 36.

An address bus 42 is interfaced with the local address bus 12 and input to a latch 44. The output of the latch 44 is connected to an internal local address bus 46. The address bus 46 contains a thirty-two bit address with bits A2-A6 input to the decode circuit 38 and the bits A7-A15 input to the address input of caches 36. The multiplexer 40 and decoder 38 provide access to one side of the caches 36 to allow data transfer to occur between the caches 36 and the central processing unit 10. In order to interface with the system data bus, an internal system data bus 48 is provided that is connected to the input of a multiplexer circuit 54 and a buffer 51. The other input of buffer 51 is connected to bus 32, buffer 51 allowing data transfer between buses 32 and 48. The multiplexer 54 provides eight outputs to a Line Read buffer 56 that interfaces with the input of the multiplexer 52. The Line Read buffer 56 is operable to perform a "Line Fill" operation during a READ operation from the main system memory 23, wherein an entire line of any one of the caches 36 is completely filled after the central processing unit 10 has received the requested data from the main system memory 23. For example, if the central processing unit 10 accessed data that was not in the caches 36, it would be retrieved from the main system memory 23 through the system data bus 20 and the internal system data bus 48 for transfer directly through caches 36. However, the central processing unit 10 only needs one thirty-two bit data word, whereas the data cache requires thirty-two double words to fill an entire line. As such, the Line Read buffer 56 is operable to complete the filling of the line after the data has been accessed by the central processing unit 10. This is a conventional technique and is referred to as a cacheable line buffer.

A cache tag memory 58 is provided which is operable to store a tag address, indicating what data is stored in the caches 36. The local address bus 46 has bits A7-A15 input to the address decode input of the cache tag memory 58 and also the data input to the cache tag memory 58 is connected to the higher order address bits A16-A31. In general, as described above, the cache tag memory 58 is configured of a tag directory for interfacing with the secondary cache and a Content Addressable Memory (CAM) for interfacing with the primary cache. The CAM, as will be described hereinbelow, receives the full address A7-A31 and searches for a match.

Each of the four separate cache segments (four separate ways) in the caches 36 has associated therewith a separate cache tag in the cache tag memory 58. Whenever a hit is detected in either the primary or secondary cache of any of the four ways, a hit is indicated on a separate one of four lines 60. Each of the lines 60 are input to an OR gate 62, the output of which indicates a hit of any type, this being input to a cache and local bus control circuit 64. The cache control circuit 64 is operable to detect which of the primary cache 26 or secondary cache 28 has a hit associated therewith and then, control where the data is read from and written to, with respect to the local side of the cache memory system 24. A system bus control 66 is provided for interfacing with the system side of the cache memory system 24. The local address bus 46 is input to a buffer 68, the output of which is input to a Write Address buffer 70 and to the system address bus, the Write Address buffer 70 for storing the address from the CPU 12. In a similar manner, a Write Data buffer 72 is provided that interfaces with the system data bus 48 to buffer data therein. The system bus control 66 also is interfaced with an internal system control bus 74.

The system bus control 66 outputs enable signals to the Write Address buffer 70 and the Write Data buffer 72. A latch enable signal is output by the cache control circuit 64 to each of the Write Address buffer 70 and Write Data buffer 72. In operation, the Write Address buffer 70 and Write Data buffer 72 are operable to buffer the data and address that is being written to the main system memory 23 to allow the system bus control 66 to interface with the various system buses at the proper time. This is a conventional aspect of a look through cache and is referred to as a buffered write-through policy. The system bus control circuit 66 also interfaces with the cache control circuit 64 by outputting a status request to the cache control system 64 and receiving both a request output and bus attribute output from the cache control circuit 64. The cache control circuit 64 interfaces with the local control bus 16 through an internal local control bus 76.

In operation of the cache, an address is input to the latch 44 and then both the primary and secondary caches 26 and 28 accessed at the same time through their respective cache tag memories 58. In this operation, the system looks for a hit from either of the primary cache 26 or the secondary cache 28 to determine if data is stored in the caches 36. If it is determined that a hit occurred in the primary cache 26, access to the portion of the caches 36 associated with the secondary cache 24, i.e., the DRAM portion, is inhibited and data is output from the primary cache portion of the caches 36, i.e., the SRAM portion. However, if no hit is made on the primary cache portion of the caches 36, but, rather, a hit is made on the secondary cache portion of the caches 36, the cache tag memory 58 still outputs a hit, but it is indicated that this hit is on the secondary cache 28 only.

Whenever the requested information is determined to be in the secondary portion of the caches 36, a transfer signal is output to the caches 36 to transfer the data from the secondary cache portion of caches 36 through the primary cache portion of the caches 36, through the multiplexer 40 and then output through the local data bus 32. A multiplexer control signal from the cache tag memory 58 determines which of the four ways in the caches 36 the data is to be output from. During the transfer, both a portion of the cache tag memory 58 associated with the primary cache portion of the caches 36 is updated, in addition to the requested information being stored in the primary cache portion of the caches 36. It should be noted that this is done at the same time that data is read out of the caches 36. This will be described in more detail hereinbelow.

If it is determined that a hit does not occur in either the primary or secondary cache portions of the caches 36, this determined by the cache tag 58, the cache control circuit 64 transfers control to the system bus control circuit 66. The information that has been requested by the central processing unit 12 is then accessed by the system bus control 66. This information is then input directly through to the Line Read buffer 56 and the decode circuit 38 and onto the local data bus 32. Thereafter, the Line Read buffer 56 is operable to perform a "Line Fill" by retrieving the remaining data words in the addressed row in the main system memory 56. As described above, the Line Read buffer 56 is input directly to the multiplexer 52. The system bus control 66 operates in conjunction with the Line Read buffer 56 to output an entire line or row of data for input to the multiplexer 52 and the selected one of the four ways in the caches 36. A "Least Recently Used" (LRU) algorithm is utilized to determine which of the four ways in the secondary cache portion of the caches 36 the accessed data is to be input to.

Figure 3:
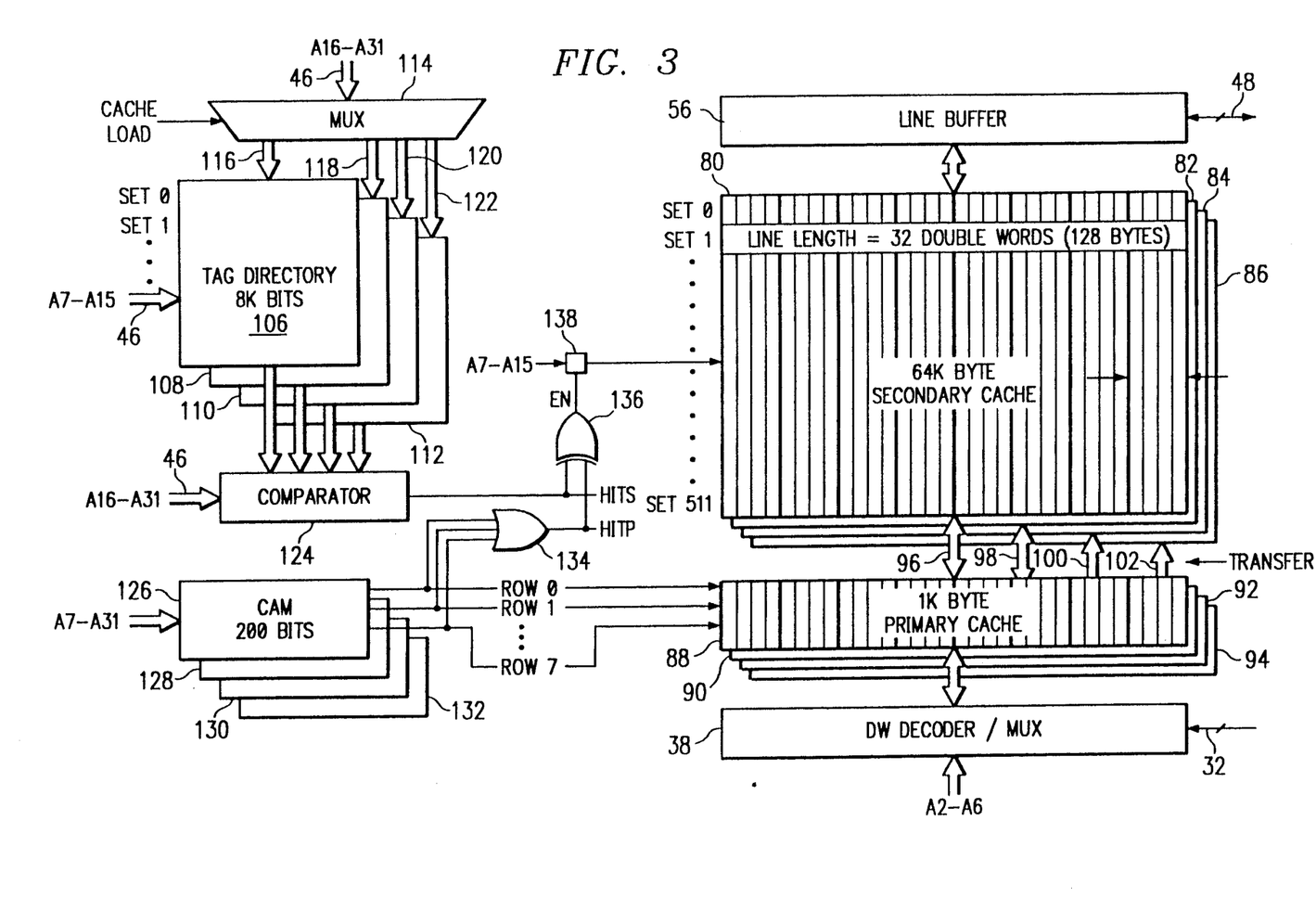
FIG. 3 illustrates a block diagram of the cache RAM and the tag directory.

Referring now to FIG. 3, there is illustrated a block diagram of the memory map for the cache address. As described above, the caches 36 are comprised of both a secondary cache portion and a primary cache portion. The caches 36 are divided into four secondary cache memories, 80, 82, 84 and 86. Each of the four secondary cache memories 80-86 are comprised of a 64K byte memory array. The memory array is organized to map directly onto the main system memory 23, and it is 128 bytes wide by 512 rows deep. Each of the secondary cache memories 80-86 are set associative with respect to the main memory 23; that is, each page in the memory has 512 rows and is 128 bytes wide. Therefore, any data that is stored in the secondary cache memories 80-86 at any given row is stored at an equivalent row in the main system memory 23. The address bits A7-A15 define the row both in the secondary cache memories 80-86 and also in the main system memory 23 at which the data resides. The data bits A3-A6 define the column in which the data resides and the bits A16-A31 define the page in the main system memory at which a given row of data resides.

The output of each of the secondary cache memories 80-86 is input to one of four primary cache memories 88, 90, 92 and 94, respectively, through respective bus line transfer circuits 96, 98, 100 and 102. Each of the bus line transfer circuits 96-102 operate in response to a transfer signal from the cache control circuitry 64, the transfer circuits providing isolation between the secondary cache memories 80-86 and the primary cache memories 88-94.

Each of the primary cache memories 88-94 is identical in width to the secondary cache memories 80-86, but they are only eight rows deep. Each of the primary caches memories 88-94 is associated with only one of the secondary cache memories 80-86, such that transfer of data can only occur from one of the secondary cache memories 80-86 to the respective one of the primary cache memories 88-94, or data may be simultaneously written into one of the secondary cache memories 80-86 and the associated one of the primary cache memories 88-94, as described hereinbelow.

Each of the secondary cache memories 80-86 has associated therewith a tag directory 106, 108, 110 and 112, respectively. Each of the tag directories 106-112 has a data input which is received from the multiplexer 114 on separate buses 116, 118, 120 and 122. The multiplexer 114 input is connected to the local address bus 46 to address bits A16-A31. A cache load control from the cache control circuit 64 determines which of the four tag directories 106-112 the address bits A16-A31 are to be stored in, and the address A7-A15 determines which row of the tag directories 106-112 the data in the form of the address bits A16-A31 is stored in. The output of the tag directories 106-112 are input to a comparator 124 which compares the outputs of each of the tag directories 106-112 with the address bits A16-A31 on the local address bus 46. The output of the comparator 124 indicates a hit in the secondary cache which is output as a signal HITS. Although the comparator 124 is illustrated as a single comparator, it is in the preferred embodiment comprised of four separate comparators.

Each of the primary data cache memories 88-94 has associated therewith a Content Addressable Memory (CAM) 126, 128, 130 and 132, respectively. Each of the CAMs 126-132 has match outputs provided, one each input to a separate row of the associated one of the primary cache data memories 88-94. Therefore, a match on any one of the outputs of the CAMs 126-132 will result in a match output that essentially provides a word line driver for one of the eight rows of data stored in the respective one of the primary cache data memories 88-94. Each one of the CAMs 126-132 is comprised of two hundred bits of memory. There are twenty-five memory elements associated with each output from each of the CAMs 126-132. Each CAM memory cell is operable to store one bit of the input address A7-A31. The input to the CAM is connected to the bits A7-A31 on bus 46 wherein, in one operation the cache controller 64 determines where to store the bits on the local address bus 46, and, in another operation, the bits on the address bus 46 are compared with the contents of all of the rows of CAM memory cells in each of the CAMs 126-132. A CAM provides a much faster search in addition to providing a fully associative tag that allows the data to be placed in any position within a given one of the primary cache data memories 88-94.

Each of the outputs of the CAMs 126-132 are input to a multiple input OR gate 134, the output of which provides the hit indicator HITP for the primary data cache. In addition, both the hit signal HITP and the hit signal HITS are input to both inputs of an exclusive OR gate 136, the output of which is input to a gating circuit 138 that is operable to enable access to the secondary cache data memory 80-86. As will be described hereinbelow, an enable signal is required in order to access the data in the secondary cache data memories 80-86, which access can only occur if a hit was not indicated in the primary cache data memories 88-94.

There are two situations that can occur when extracting data from the cache memory system 24. The data can be found in the primary data cache memories 88-94 or in the secondary cache memories 80-86. However, the access time to the secondary data cache memories 80-86 is slower than that for the primary data cache memories 88-94. Therefore, if a hit is indicated in the primary cache memory 26, it is not necessary to initiate an access of the secondary data cache memories 80-86. Therefore, access is inhibited by the gate 136 when it is determined that both HITS and HITP indicate a hit. Of course, if a hit is indicated by HITP, a hit is also indicated by HITS.

When the central processing unit 12 initiates data access to the cache, the cache control circuit 64 attempts access to both the secondary cache data memories 80-86 and the primary cache data memories 88-94 by inputting the address to both the tag directories 106-112 and the CAMs 126-132. If a hit is indicated in the CAMs, access to the secondary data cache is inhibited and the information is transferred out to the data bus 32 from the appropriate one of the columns decoded by the data bits A2-A6. In addition, the cache controller circuit 64 interfaces with the central processing unit 12 to determine what the wait states for the central processing unit 12 will be. Typically, with the primary cache data memories 88-94 utilizing SRAM technology, it can be a zero wait state condition.

If a hit is not detected from the primary data cache, the access to the secondary cache data memories 80-86 continues in the event that a hit is determined by the presence of the HITS signal. If so, the appropriate one of the data memories 80-86 is accessed at the row determined by the address bits A7-A15. After access of the data, i.e., sensing in the DRAM configuration, the transfer circuits 96-102 are activated and data transferred through the associated one of the primary data cache memories 88-94 to the data bus 32 after decoding with the address bits A2-A6. At the same time, the cache control circuit 64 determines which of the eight rows in the associated one of the primary data cache memories 88-94 the information will be stored in. This is a line for line transfer such that each bit in the accessed row of the associated one of the secondary cache data memories 80-86 is transferred simultaneously to the selected bit location in the primary data cache memories 88-94, while it is being transferred to the data bus 32. The one of the rows in the associated primary data cache memory 88-94 in which the data is stored is determined on an LRU algorithm basis by the cache control circuit 64. It should be noted that the LRU algorithm can only select one of the eight rows in the associated one of the primary cache data memories 88-94 for storage of data.

In the event that neither the secondary data cache memories 80-86 or the primary data cache memories 88-94 contains the data, the system bus control circuitry 66 will initiate an access to the main system memory 23. When this occurs, the cache local bus control 64 accesses the particular row of information from the main system memory 23 and inputs it to bus 48 and then to the Line Read buffer 56. The output of Line Read buffer 56 is then input to decoder 38 to select the requested information to bus 32 for routing directly to the central processing unit 10. A WRITE operation is then initiated for a select one of the secondary data cache memories 80-86 and also for the associated one of the primary cache data memories 88-94. The select one of the secondary data cache memories 80-86 is determined with an LRU algorithm by the cache control circuitry 64 at the row addressed by bits A7-A15 on bus 46. Data is then input from the Line Read buffer 56 to the associated data lines on the select one of the secondary data cache memories 80-86 and the primary data cache memories 88-94 with the associated one of the transfer circuits 96-102 activated. The location in the associated one of the primary cache memories 88-94 in which the data is stored is again determined by an LRU algorithm.

Figure 4:
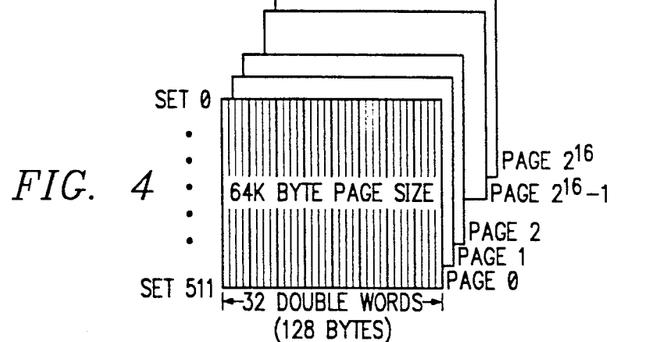
FIG. 4 illustrates a diagrammatic view of the main memory address map.

Referring now to FIG. 4, there is illustrated a main memory address map which consists of $2^{16}$ 64K byte pages. Each page is thirty-two double words wide (128 bytes) and 512 rows deep. This corresponds to each of the secondary data cache memories 80-86. Therefore, the same row in four different pages in the main memory can be stored in the secondary data cache, since it is a four-way set associative cache. However, it should be understood that the four-way set associative architecture is not limited and additional layers of data cache can be utilized.

Figure 5:
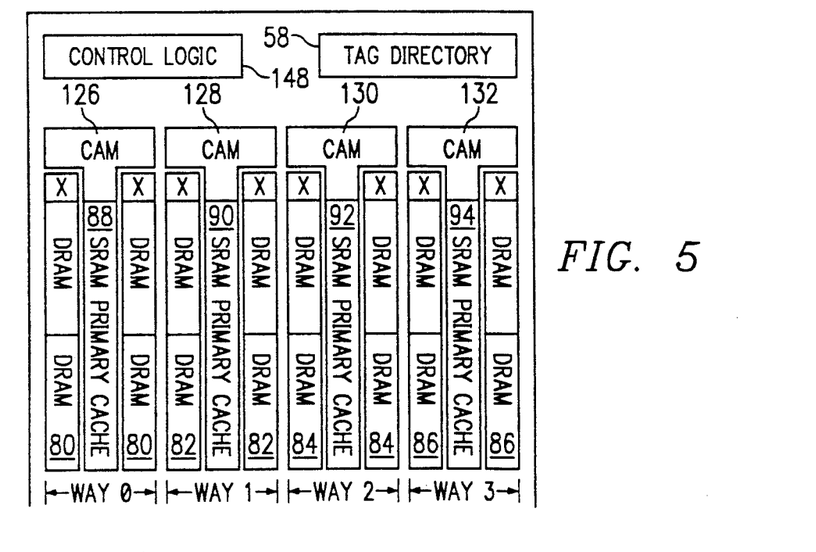
FIG. 5 illustrates a layout of the chip.

Referring now to FIG. 5, there is illustrated a chip layout for the cache memory system 24. Each of the secondary data cache memories 80-86 is comprised of an array of dynamic random access memory cells. The DRAM is divided into two arrays with the associated one of the primary data cache memories 88-94 disposed therebetween, and consisting of static random access memory cells. The associated one of the primary data cache memories 88-94 is disposed between the two halves of the DRAM arrays for the secondary data cache memories 80-86. The associated one of the CAMs 126-132 is disposed adjacent the associated one of the primary data cache memories 88-94. The memory arrays are disposed on one side of the chip and the tag directory 58 disposed on the opposite and lower corner of the chip. A control logic block 148 is provided that contains the cache control logic circuitry 64 and the system bus control logic circuitry 66.

Figures 6, 7:
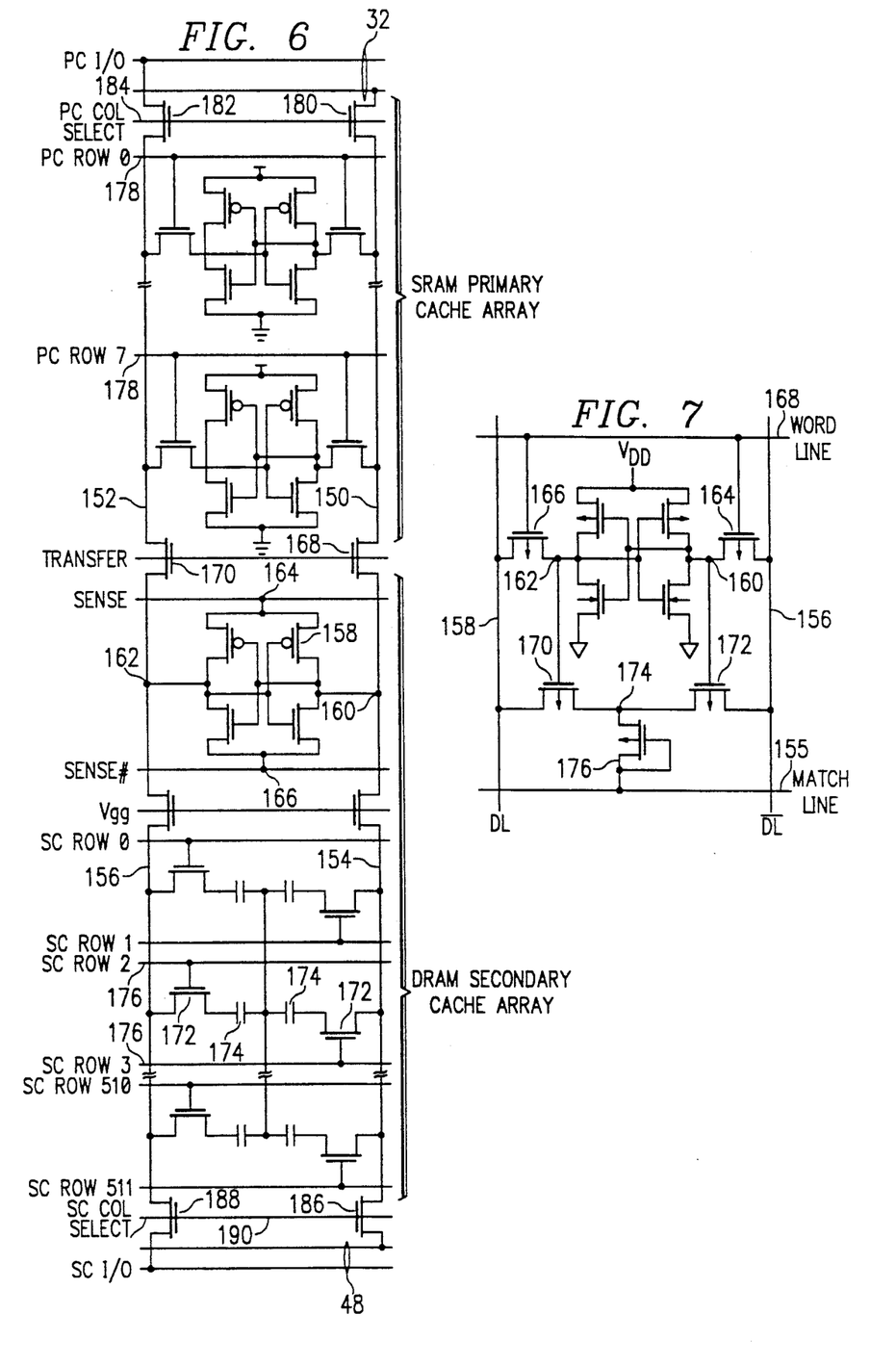
FIG. 6 illustrates a layout of the primary and secondary cache array for one column.
FIG. 7 illustrates one memory cell for the content addressable memory.

Referring now to FIG. 6, there is illustrated a schematic diagram of one column of memory cells for an associated one of the secondary data cache memories 80-86 and the primary cache data memories 88-94. Each of the columns in the primary cache data memories 88-94 has two data lines 150 and 152 associated therewith. In a similar manner, each column of the secondary cache data memories 80-86 has two data lines 154 and 156 associated therewith. A sense amp is provided for the secondary cache array which consists of a cross-coupled CMOS latch 158 that has one side thereof connected to a sense node 160 and the other side thereof connected to a sense node 162. The latch 158 is operable to sense data on the data lines 154 and 156 and latch them thereto. The sensing operation is controlled by a sense signal on a node 164 and an inverted sense signal on a node 166. Transfer transistors 168 and 170 are provided that are operable to transfer the voltage on nodes 160 and 162 to data lines 150 and 152, and correspond to the transfer circuits 96-102.

Each of the memory cells in the secondary cache array is comprised of a one transistor DRAM cell having a single transistor 172 and a storage capacitor 174. A word line 176 is connected to the gate of the transistor 172, the transistor 172 operable to transfer the charge stored on capacitor 174 to the respective one of the data lines 154 or 156 during a Read operation.

Each of the memory cells in the primary cache array is comprised of an SRAM cell. The SRAM cell is a six transistor cell connected between data lines 150 and 152 and activated by a word line 178. The end of the data lines 150 and 152 diametrically opposite from the transfer transistors 168 and 170, are each connected to one side of the source/drain path of column select transistors 180 and 182, respectively. The column select transistors 180 and 182 have the gates thereof connected to a column select line 184 that is a decoder output from decoder 138. The other end of the source/drain path of transistors 180 and 182 is connected to the true and complement bit lines of the data bus 32, respectively. In a similar manner, the data lines 154 and 156 on the ends diametrically opposite to the transistors 168 and 170 are respectively connected to one side of the source/drain path of column select transistors 186 and 188. The other side of the source/drain paths of transistors 186 and 188 are connected to the respective true and complement lines of the associated bit in the data bus 48. The gates of transistors 186 and 188 are controlled by a column select line 190 that is output from the decoder 50 in response to the data bits A2-A6.

Referring now to FIG. 7, there is illustrated a schematic diagram of a memory cell for the CAMs 126-132. The CAM generally stores data consisting of a tag and a value. Instead of giving an address, a data pattern is given to the tag section of the CAM, and whether or not an item that has the specified tag exists in the memory is determined. If such an item exists, the memory sends out an appropriate "match" signal. The CAM cell must also be readable and writable just as an ordinary memory cell. Each of the cells has a match line 155 that is common to all memory cells in a given row, the match line 155 providing an output. Two data lines 156 and 158 are provided for writing data into the memory cell. The memory cell is a standard cross-coupled latch comprised of two P-channel transistors and two N-channel transistors connected in a cross-coupled configuration to data nodes 160 and 162. Data node 160 is connected through the source/drain path of a transistor 164 to the inverted data line 156 and data node 162 is connected through the source/drain path of a transistor 166 to the data line 158. Transistors 164 and 166 have the gates thereof connected to a word line 168 to allow writing of data to the memory cell during a WRITE operation or during a READ operation.

The data node 162 is connected to the gate of a P-channel transistor 170 and the data node 160 is connected to the gate of a P-channel transistor 172. The source/drain path of transistor 170 is connected between the data line 158 and a node 174. Similarly, the source/drain path of transistor 176 is connected between the node 174 and the inverted data line 156. A P-channel transistor 176 is connected between the match line 155 and the node 174 and configured as a diode.

In operation, if a "1" is stored on the node 162 and the match line is precharged to ground, a determination can be made as to whether or not a tag bit "1" is stored in the cell by pulling the data line 158 high and the inverted data line 156 low. If data node 162 is high, transistor 170 is off and the match line 155 remains low, indicating coincidence at this bit location. If the stored data in the cell is low at data node 162, the match line 155 is pulled up by the transistor 170 and this pull-up indicates that coincidence was not found. To check whether or not the tag bit "0" is stored in the cell, the inverted data line 156 is held high and the data line 150 is held low. If a "0" is stored in the cell, the data node 160 is high, and therefore, the match line 155 stays low, indicating a hit. In the CAM implementation described hereinabove, twenty cells per row are wire-ORed onto a commed match line 155.

Figure 8:
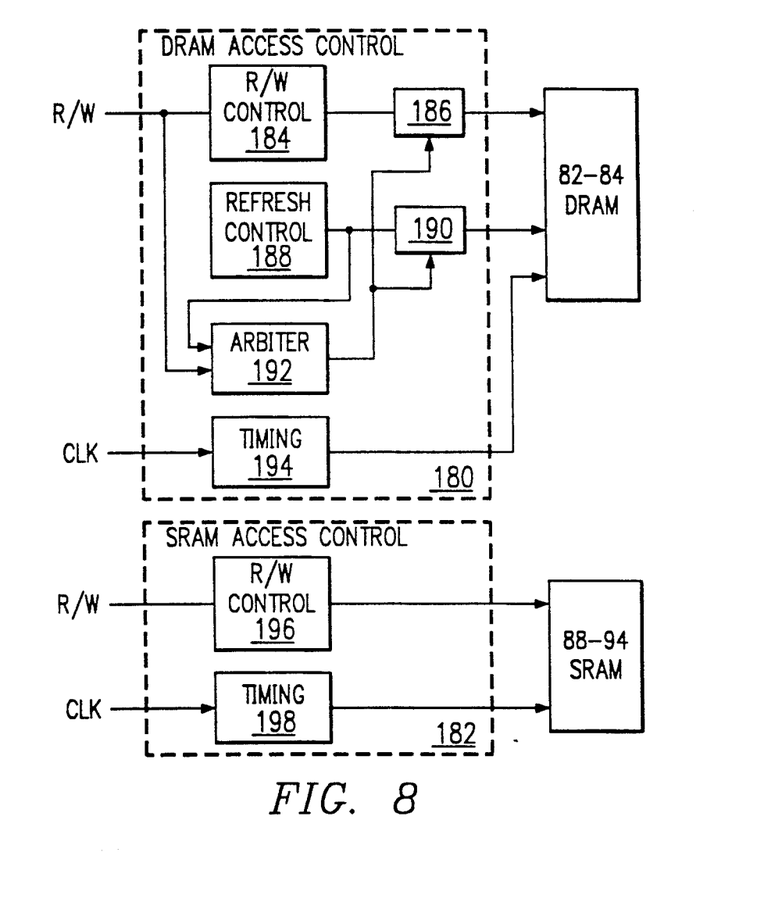
FIG. 8 illustrates a block diagram of the access control for the SRAM and DRAM in the primary and secondary caches.

Referring now to FIG. 8, there is illustrated a block diagram of a DRAM access control circuit 180 and SRAM access control circuit 182. The DRAM access control circuit 180 is operable to provide the Read/Write control signals, refresh control signals and timing signals for the secondary cache memories 82-84. In a similar manner, the SRAM access control circuit 182 is operable to provide the Read/Write control signals and the timing signals for the primary cache memories 88-94. The cache control circuit 184 is operable to generate the Read/Write control signal (R/W) and also a clock signal CLK is also provided. When the R/W control signal is generated, it is input to the DRAM access control circuit 180 and also the SRAM access control circuit 182. In the DRAM access control circuit 180, a R/W control circuit 184 is provided for outputting the various memory access signals for controlling the Read and Write operation of the memories 82-84. However, a gate 186 is provided to allow this operation to be inhibited. A refresh control circuit 188 is provided which is also output to the memories 82-84 through a gate 190. The refresh control circuit 188 contains a refresh timer and various refresh control circuits to perform a refresh operation on the memories 82-84. Refresh control is well known in the art and in general requires that periodically each row of memory be refreshed. However, if the refresh timer has determined that the refresh operation is to take place, it is necessary to inhibit access to the memories 82-84 by the R/W control circuit 184. Alternatively, if the memories 82-84 are being accessed for a Read/Write operation, it would then be necessary to inhibit operation of the refresh control circuitry 188. An arbiter 192 is provided which receives on the input thereof the R/W control signal and the output of the refresh control 188. The arbiter 192 determines which operation is to take place and controls the gates 186 and 190. The DRAM access control circuit 180 also contains timing circuitry 194 to control the overall timing of the Read and Write operation of the memories 82-84 and also the refresh operation.

The SRAM access control circuitry 182 contains a R/W control circuit 196 that receives the R/W control signal and outputs conventional access control signals to memories 88-94. Timing is also provided by a timing circuit 198 that receives the CLK signal and outputs general timing signals to the memories 88-94 in a conventional manner.

In summary, there has been provided a cache memory system for being disposed between a central processing unit and a main system memory in a look through architecture. The cache memory system includes both a primary cache and a secondary cache. The primary cache is a higher speed cache than the secondary cache. When accessing the cache memory, a hit at the primary cache results in faster transfer of data than a hit in the secondary cache. When a hit in the secondary cache is made with no hit in the primary cache, the data is transferred from the secondary cache to the central processing unit and also simultaneously to the primary cache. The transfer between the secondary cache and the primary cache is a line for line transfer, thus increasing the efficiency of the cache operation. Further, the primary cache and the secondary cache are isolated such that when data is transferred from the primary cache to the central processing unit, the secondary cache can have data input thereto from the main system memory.

Although the preferred embodiment has been described in detail, it should be understood that various changes, substitutions and alterations can be made therein without departing from the spirit and scope of the invention as defined by the appended claims.

What is claimed is;

1. A cache memory for interfacing between a central processing unit and main system memory for storing information, comprising:
   a primary cache memory for storing information, said primary cache memory having:
      a primary information cache comprised of static random access memory for storing data and instructions, and
      a primary tag cache for storing a tag that indicates whether information being requested by said central processing unit is stored in said primary information cache;
   a second cache memory for storing information, said second cache memory having:
      a second information cache comprised of dynamic random access memory for storing data and instructions, and
      a second tag cache for storing a tag that indicates whether information being requested by said central processing unit is stored in said secondary cache;
   an interface circuit for allowing information to be transferred from said second cache memory to said primary cache memory;

hit circuitry for receiving an information request from the central processing unit and determining if the requested information is present in either the primary cache memory or the secondary cache memory; and cache control circuitry for accessing the requesting information from said primary cache memory when the requested information is determined to be in said primary cache memory by said hit circuitry and for accessing the requested information from said secondary cache memory when the requested information is determined by said hit circuitry to be in said secondary cache memory and not in said primary cache memory, said cache control circuitry transferring the requested information from said secondary cache memory to said primary cache memory during access of the requested information from said secondary cache memory;

each of said static random access memory in said primary information cache and said dynamic random access memory in said secondary cache sharing pseudo common column lines isolated between said static random access memory and said dynamic random access memory by said interface circuit, wherein said interface circuit is operable to do a column-to-column transfer between said dynamic random access memory and said static random access memory.

2. The cache memory of claim 1 wherein said secondary cache memory has a slower access time than said primary cache memory.

3. The cache memory of claim 1 wherein said primary tag cache comprises a content addressable memory.

4. The cache memory of claim 1 wherein said cache control circuitry is operable to simultaneously initiate access each of said primary and second cache memories for the requested information during the time said hit circuitry is determining if the requested information is in said primary or said second cache memories and inhibit continued access of said secondary cache memory when said hit circuitry indicates that the requested information is present in said primary cache memory.

5. The cache memory of claim 1 wherein said secondary cache memory is set associative relative to the main system memory.

6. The cache memory of claim 5 wherein said primary cache memory is fully associative relative to the main system memory.

7. The cache memory of claim 1 wherein said primary cache memory and said secondary cache memory are configured in a look through cache architecture, said cache control circuitry operable to initiate access of the requested information from the main system memory when said hit circuitry determines that the requested information is not present in either said primary cache memory or said secondary cache memory.

8. A cache memory for interfacing between a central processing unit and a main memory system comprising:
a primary cache memory for storing information and having a first access speed, said primary cache memory having:
a primary information cache comprised of static random access memory for storing data and instructions,
a primary tag cache for storing a tag that indicates whether information being requested by said central processing unit is stored in said primary information cache;

a second cache memory for storing information and having a second access speed slower than said first access speed, said secondary cache memory having:
a primary information cache comprised of dynamic random access memory for storing data and instruction,
a primary tag cache for storing a tag that indicates whether information being requested by said CPU is stored in said primary information cache;

hit circuitry for receiving an information request from the central processing unit is present in either said primary cache memory or said second cache memory; and cache control circuitry for accessing the requesting information from said primary cache memory when said hit circuitry determines that the requested information is stored in said in said primary cache memory, and for accessing the requested information from said secondary cache memory when said hit circuitry determines that the requested information is stored in said secondary cache memory and not in said primary cache memory;

each of said static random access memory in said primary information cache and said dynamic random access memory in said secondary cache sharing pseudo common column lines isolated between said static random access memory and said dynamic random access memory by said interface circuit, wherein said interface circuit is operable to do a column-to-column transfer between said dynamic random access memory and said static random access memory.

9. The cache memory of claim 8 wherein said cache control circuitry is further operable to transfer said requested information from said secondary cache memory to said primary cache memory when said cache control circuitry accesses the requested information from said secondary cache memory, said transfer occurring simultaneous with access of the requested information from said secondary cache memory.

10. The cache memory system of claim 8 wherein said primary tag cache comprises a content addressable memory.

11. The cache memory of claim 8 wherein said cache control circuitry is operable to simultaneously initiate access to each of said primary and second cache memories for the requested information during the time said hit circuitry is determining if the requested information is in said primary or said second cache memories and inhibit continued access of said secondary cache memory when said hit circuitry indicates that the requested information is present in said primary cache memory.

12. The cache memory of claim 8 wherein said secondary cache memory is set associative relative to the main memory system.

13. The cache memory of claim 12 wherein said primary cache memory is fully associative relative to the main system memory.

14. The cache memory of claim 8 wherein said primary cache memory and said secondary cache memory are configured in a look through cache architecture, said cache control circuitry operable to initiate access of the requested information from the main system memory when said hit circuitry determines that the requested information is not present in either said primary cache memory or said secondary cache memory.

15. A cache memory for interfacing between a central processing unit and a main memory system comprising:
   providing a primary cache memory for storing information, the step of providing the primary cache memory including:
      providing a primary information cache utilizing a static random access memory for storing data and instructions therein, and
      providing a primary tag cache for storing a tag that indicates whether information being requested by said central processing unit is stored in the primary information cache;
   providing a secondary cache memory for storing information, the step of providing the secondary cache including:
      providing a secondary information cache utilizing a dynamic random access memory for storing data and instructions, and
      providing a secondary tag cache for storing a tag that indicates whether information being requested by the central processing unit is stored in the second cache;
   receiving an information request from the central processing unit and determining if the requested information is determined to be in the primary cache memory;
   accessing the secondary cache memory when the requested information is determined to be in the secondary cache memory and not in the primary cache memory;
   each of the static random access memory and the dynamic random access memory sharing pseudo common column lines; and
   transferring the requested information from the secondary cache memory to the primary cache memory for storage therein during access of the requested information from the second cache memory by isolating the pseudo common column lines of the dynamic random access memory from the static random access memory until the time of transfer, during which a column-to-column transfer is effected between the dynamic random access memory and the static random access memory.

16. The method of claim 15 wherein the secondary cache memory has a slower access time than the primary cache memory.

17. The method of claim 15 wherein the step of providing the primary tag cache comprises providing a content addressable memory.

18. The method of claim 15 wherein the steps of accessing the requested information from the primary cache memory and accessing the requested information from the secondary cache memory comprises:
   simultaneously initiating access to each of the primary and secondary cache memories for the requested information during the time of determining it the requested information is in the primary and second cache memories; and
   inhibiting continued access of the secondary cache memory when it is determined that the requested information is in the primary cache memory.

19. The method of claim 15 wherein the secondary cache memory is set associative relative to the main system memory.

20. The method of claim 19 wherein the primary cache memory is fully associative relative to the main system memory.

21. The method of claim 15 and further comprising configuring the primary cache memory and the secondary cache memory in a look through cache architecture, and further comprising accessing the requested information from the main system memory when it is determined that the requested information is not present in either the primary cache memory or the secondary cache memory.

* * * * *